UNITED STATES PATENT OFFICE.

HARRY C. PEFFER, OF EAST ST. LOUIS, ILLINOIS, ASSIGNOR TO THE PITTSBURGH REDUCTION COMPANY, OF NEW KENSINGTON, PENNSYLVANIA, A CORPORATION OF PENNSYLVANIA.

PROCESS OF MANUFACTURING ALUMINA.

No. 826,354.     Specification of Letters Patent.     Patented July 17, 1906.

Application filed February 2, 1906. Serial No. 299,111.

*To all whom it may concern:*

Be it known that I, HARRY C. PEFFER, of East St. Louis, county of St. Clair, and State of Illinois, have invented a Process for the Manufacture of Alumina, of which the following is a specification.

In the practice of my invention as preferably practiced I mix lime with ground bauxite, preferably in a wet state, and afterward heat the same to a red heat, either in a retort or in a furnace, or the heating may be done in a rotary kiln. The reaction thus caused produces calcium aluminate and calcium alumino-silicate. The proportions of the materials which I employ are preferably about fifty-six parts of $CaO$ (or an equivalent of carbonate of lime may be employed) and sufficient bauxite to yield about one hundred and two parts of $Al_2O_3$ and an equal amount of $CaO$ for every sixty parts of silica contained in the bauxite. If this product be heated or digested with a solution of carbonate of soda, enough carbonate of soda being employed to supply sixty-two parts of $Na_2O$ to every one hundred and two parts of $Al_2O_3$ and the carbonate of soda being preferably added in excess, the aluminate of calcium will be decomposed, forming soluble aluminate of soda, the other compounds produced being insoluble. The aluminate of soda can then be filtered off and the alumina extracted from the solution by known methods, preferably by passing carbon dioxid through the solution.

I believe I am the first to produce alumina by treating aluminate of an alkaline-earth metal (preferably calcium aluminate) with carbonate of soda for the production of aluminate of soda, from which the alumina can be separated, and am the first to separate alumina from the aluminate of an alkaline-earth metal produced as above described.

I therefore claim—

1. The herein-described improvement in the method of manufacturing alumina, which consists in heating lime and bauxite to produce calcium aluminate, and then treating this product with a solution of carbonate of soda, thereby decomposing the calcium aluminate to form a soluble aluminate of soda; substantially as described.

2. The herein-described improvement in the method of manufacturing alumina, which consists in treating calcium aluminate with a solution of carbonate of soda to form a soluble aluminate of soda, and then extracting the alumina from the solution; substantially as described.

3. The herein-described improvement in the manufacture of alumina, which consists in forming an aluminate of an alkaline-earth metal, and treating such aluminate with carbonate of soda to decompose the aluminate to form a soluble aluminate of soda, and then extracting the alumina from such aluminate; substantially as described.

4. The herein-described improvement in the manufacture of alumina which consists in treating bauxite with a compound containing calcium to thereby produce calcium aluminate, then treating the calcium aluminate with carbonate of soda to form a soluble aluminate of soda from which the alumina is subsequently recovered; substantially as described.

5. The herein-described improvement in the manufacture of alumina which consists in treating bauxite with a compound containing calcium to thereby produce calcium aluminate, then treating the calcium aluminate with carbonate of soda to form a soluble aluminate of soda then filtering off the aluminate of soda from the insoluble residue, and finally extracting the alumina from the solution by passing carbon dioxid therethrough; substantially as described.

6. The herein-described improvement in the method of manufacturing alumina which consists in forming an aluminate of an alkaline earth, and then decomposing the aluminate by digestion with a solution of alkali carbonate; substantially as described.

In testimony whereof I have hereunto set my hand.

HARRY C. PEFFER.

Witnesses:
   BRUCE A. CAMPBELL,
   R. J. KRAMER.